United States Patent [19]
Ziebol et al.

[11] Patent Number: 5,179,608
[45] Date of Patent: Jan. 12, 1993

[54] CONNECTOR FOR OPTICAL FIBER

[75] Inventors: Robert J. Ziebol, Blaine; Harold A. Roberts, Eden Prairie, both of Minn.

[73] Assignee: ADC Telecommunications, Inc., Minneapolis, Minn.

[21] Appl. No.: 590,000

[22] Filed: Sep. 28, 1990

[51] Int. Cl.⁵ .......................... G02B 6/36; G02B 6/38
[52] U.S. Cl. ........................................ 385/81; 385/62; 385/69; 385/72; 385/87
[58] Field of Search ................. 350/96.2, 96.21, 96.22; 385/81, 78, 84, 86, 87, 60, 62, 69, 72

[56] References Cited

U.S. PATENT DOCUMENTS

| | | | |
|---|---|---|---|
| 3,705,756 | 12/1972 | Keller et al. | 350/96.20 |
| 3,734,594 | 5/1973 | Trambarulo | 350/96.21 |
| 3,880,452 | 4/1975 | Fields | 350/96.21 |
| 4,080,044 | 3/1978 | Gousseau | 350/96.15 |
| 4,159,900 | 7/1979 | Elden | 65/4 B |
| 4,184,741 | 1/1980 | Hawk et al. | 350/96.20 |
| 4,193,665 | 3/1980 | Arnold | 350/96.22 |
| 4,232,934 | 11/1980 | Feinbloom | 350/96.20 |
| 4,268,115 | 5/1981 | Slemon et al. | 350/96.21 |
| 4,319,802 | 3/1982 | Bowes | 350/96.20 |
| 4,370,022 | 1/1983 | Johnson | 350/96.21 |
| 4,390,237 | 6/1983 | Marazzi | 350/96.20 |
| 4,406,515 | 9/1983 | Roberts | 350/96.21 |
| 4,422,716 | 2/1983 | Morimoto et al. | 350/96.21 |
| 4,447,121 | 5/1984 | Cooper et al. | 350/96.20 |
| 4,487,474 | 12/1984 | Nishie et al. | 350/96.21 |
| 4,541,685 | 9/1985 | Anderson et al. | 350/96.21 |
| 4,545,644 | 10/1985 | De Veau, Jr. et al. | 350/96.21 |
| 4,615,581 | 10/1986 | Morimoto | 350/96.21 |
| 4,648,688 | 3/1987 | Ashman et al. | 350/96.20 |
| 4,684,205 | 8/1987 | Margolin et al. | 350/96.21 |
| 4,691,985 | 9/1987 | Shank et al. | 350/96.18 |
| 4,691,986 | 9/1987 | Aberson, Jr. et al. | 350/96.21 |
| 4,695,126 | 9/1987 | Cook | 350/96.21 |
| 4,711,518 | 12/1987 | Shank et al. | 350/96.20 |
| 4,822,131 | 4/1989 | Anderton | 350/96.21 |
| 4,832,440 | 5/1989 | Anderton | 350/96.21 |
| 4,850,670 | 7/1989 | Mathis et al. | 350/96.21 |
| 4,953,941 | 9/1990 | Takahashi | 350/92.20 |
| 5,011,258 | 4/1991 | Takeda | 350/96.20 |

FOREIGN PATENT DOCUMENTS 3112000 7/1982 Fed. Rep. of Germany .

OTHER PUBLICATIONS

Article entitled "UV-curable adhesive bonds optical fiber to connector" in Design News, Dec. 6, 1982, pp. 60-61.
Article entitled "Rapid Field Termination of an SMA Fiber Optic Connector" by R. Schults, Optical Fiber Conference, LA, Sep. 1982 pp. 165-170.

Primary Examiner—Frank Gonzalez
Attorney, Agent, or Firm—Merchant, Gould, Smith, Edell, Welter & Schmidt

[57] ABSTRACT

An optical fiber connector is shown with connector elements dimensioned and having material selected to accommodate thermal expansion to certain alignment of elements. Also, the elements are selected to accommodate compressive force to ensure a desired distribution of compressive forces between a ferrule and a fiber. The balancing ensures that the fiber and the ferrule retain a desired alignment with desired opposing forces. Also, a non-circular split sleeve of uniform wall thickness dimensions is provided to ensure uniform pressure distribution on a fiber ferrule. The split sleeve is also offset to accommodate offsetting tendencies of fibers being aligned within the split sleeve.

11 Claims, 7 Drawing Sheets

CONNECTOR FOR OPTICAL FIBER

BACKGROUND OF THE INVENTION

1. Field of the Invention

This invention pertains to an optical fiber connector for precisely positioning and aligning a pair of optical fibers.

2. Description of the Prior Art

The increased use of optical fibers in the telecommunications and signal transmission industries has lead to the need to develop connectors for optically connecting fiber pairs. Examples of such connectors are shown in U.S. Pat. No. 4,684,205, U.S. Pat. No. 4,422,716 and U.S. Pat. No. 4,850,670.

Notwithstanding prior art developments in optical fiber connectors, there is a continuing need for improved connector designs. Connectors must be compact, of minimum cost to manufacture, and should insure good optical coupling between connected fibers.

One of the problems encountered in the design of optical fiber connectors is the need to retain proper face-to-face contact between the opposing fibers. It is desirable to have the opposing fibers of two joined connectors to be in physical contact with the fibers exerting a predetermined minimum force against each other. This force must be sufficient to insure that the cores of the fibers are sufficiently close over a required operating temperature range (for example, −50° C. to 85° C.).

One common way of holding a fiber in a connector is through the use of a so-called crimp-style connector. The aforementioned U.S. Pat. No. 4,684,205 shows a crimp-style connector where a fiber is held in a clamp (item 17 in U.S. Pat. No. 4,684,205) with a point of contact spaced away from the end of the fiber. The fiber then passes through a ferrule (item 25 in the aforementioned U.S. Pat. No. 4,684,205) and may float freely within the ferrule. In such a configuration, when the connector is heated through increases in ambient temperature, the ferrule (commonly, made from glass or ceramic) will expand at a rate greater than the rate of expansion of the fiber (commonly, made from fused silica). As a result, the contacting force between the two opposing fibers may decrease below a desired minimum force since the ferrules may expand faster than the fibers. As a result, the ferrules will bear the forces intended to be experienced by the fibers.

In addition to maintaining a desired minimum contact force between the opposing fibers, it is also desirable that a connector design will address other problems encountered in the art. These include providing sleeves for aligning the ferrules in a manner which results in uniform pressure distribution on the ferrule. And the sleeves should accommodate a tendency of fibers to offset from optical alignment as the fibers approach one another within the sleeve. In addition, it is desirable that an improved connector design will address the problems associated with chipping of fibers.

It is an object of the present invention to address each of the above issues as well as others associated with optical fiber connector design.

SUMMARY OF THE INVENTION

According to a preferred embodiment of the present invention, an optical fiber connector is provided which includes means for balancing forces on opposing fibers while accounting for thermal expansion as well as compression forces experienced by the connector. In addition, according to a preferred embodiment of the present invention, a non-circular split sleeve is provided for aligning opposing fiber ferrules with uniform pressure applied to the circumference of the ferrules. Still further, according to a preferred embodiment of the present invention, a recess is provided in the end faces of opposing ferrules to avoid chipping of fibers as they come in contact. Still further, according to a preferred embodiment of the present invention, a split sleeve design is shown which is offset to introduce fiber ferrules in an offset alignment with an amount of offset selected to counteract the natural tendencies of the fibers carried by the ferrules to become offset as they approach one another.

DESCRIPTION OF THE PREFERRED EMBODIMENT

A. Overall Connector Design

1. The Connector and Mating Adaptor

Referring now to the several drawings figures in which identical elements are numbered identically throughout, a description of the preferred embodiment of the present invention will now be provided.

Figure 1:
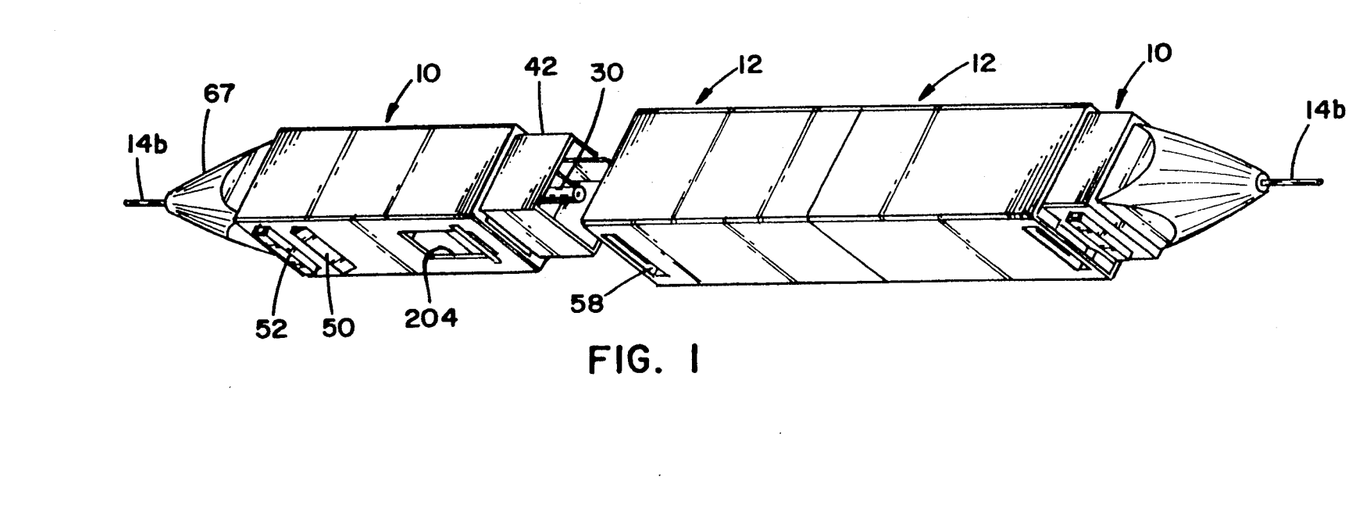
FIG. 1 is a perspective view of two optical fiber connectors with a mating adaptor, one of the connectors is shown coupled to the adaptor and the other connector is shown spaced from the adaptor.
Figure 2:
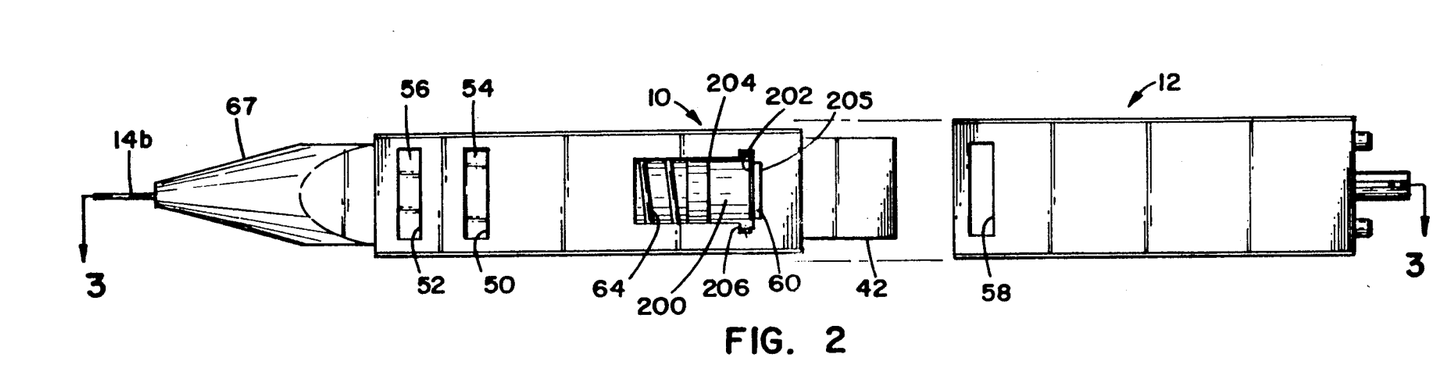
FIG. 2 is a top plan view of a single connector shown spaced from a mating half of an adaptor.
Figure 3:
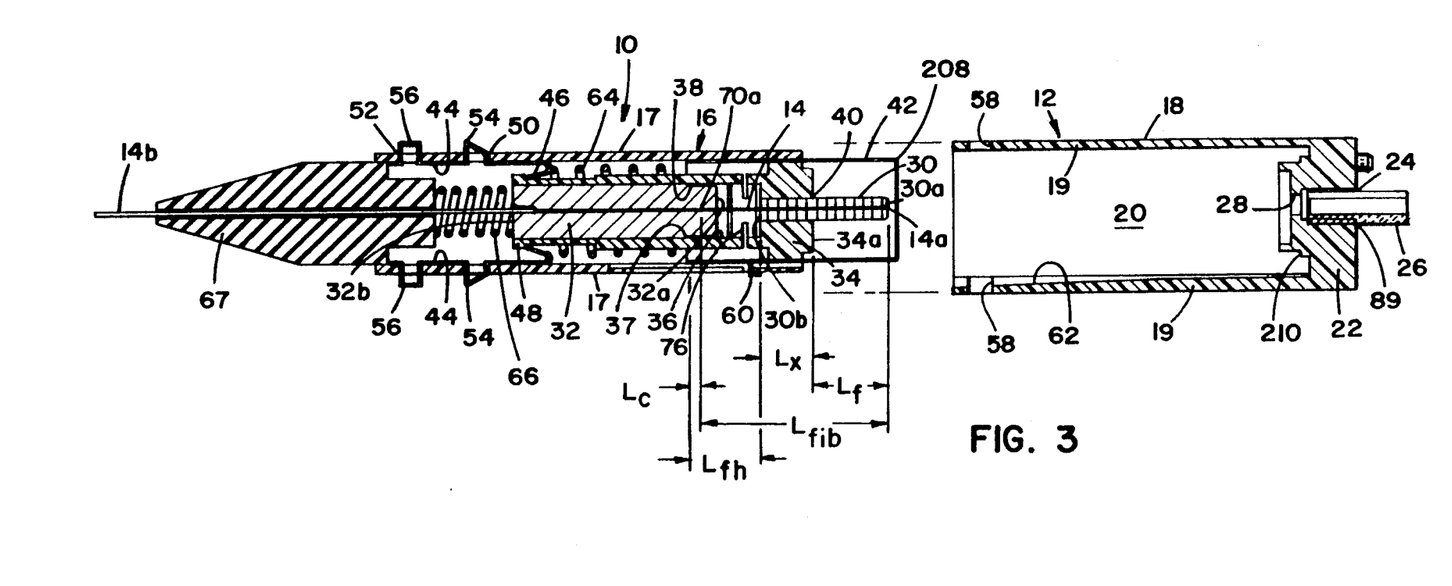
FIG. 3 is a view taken along line 3—3 of FIG. 2.

With initial reference to FIGS. 1-3, a pair of optical fiber connectors 10 are shown in association with a coupled pair of mating adaptor halves 12. Each of connectors 10 is identical as is each of adapters 12.

The right hand view of FIG. 1 shows a connector 10 fully inserted within an adaptor half 12. The left hand view shows a connector 10 spaced from and aligned with an adaptor half 12. The mating adapters 12 align the connectors 10 so that their fibers are in optical alignment.

With reference to FIGS. 2 and 3, a single connector 10 is shown spaced from its connector adaptor 12. The connector 10 includes a body 16 which is generally square in cross-section. The adaptor 12 includes an adaptor body 18 which has an interior cavity 20. The cavity 20 is square in cross-section and is sized to receive body 16.

The adaptor body 18 has an end wall 22 with a centrally disposed bore 24. Bore 24 is sized and shaped to receive a split sleeve 26 (the structure and function of which will be more fully described). Concentrically aligned with bore 24 is a smaller diameter bore 28. Bore 28 is sized to receive a ferrule 30 carried by connector 10. When a connector 10 is attached to adaptor 12, the ferrule 30 extends through bore 28 into sleeve 26. Sleeve 26 axially aligns the ferrule 30 with an opposing ferrule (not shown) so that a fiber 14 is axially aligned and optically coupled with an opposing fiber (not shown).

2. Crimp, Ferrule Holder and Ferrule

Figure 3A:
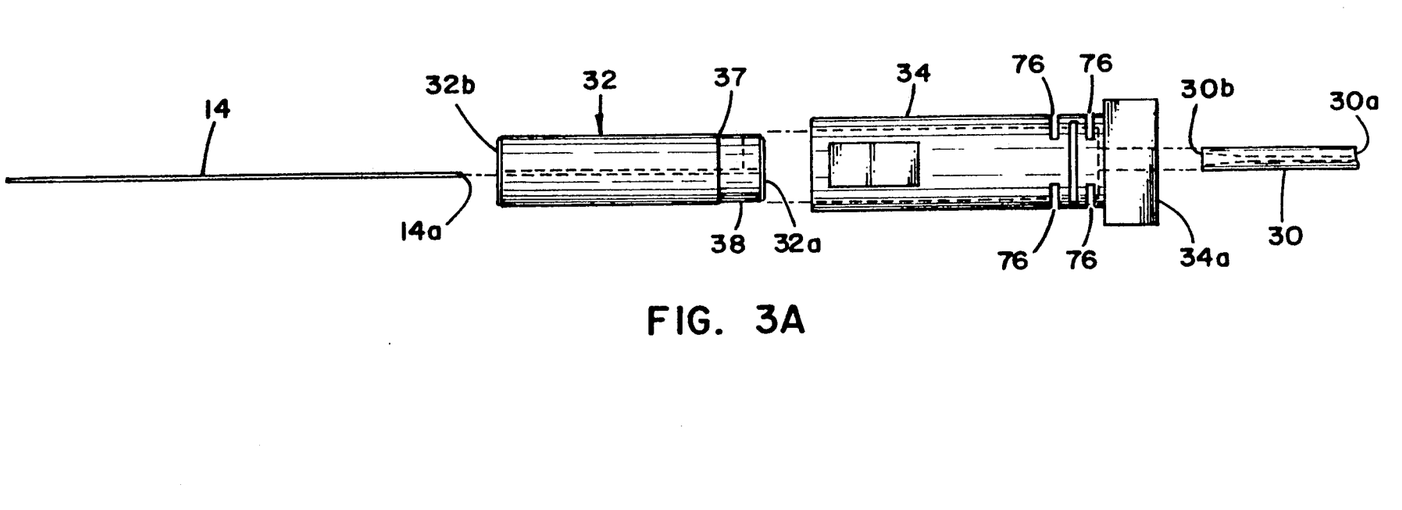
FIG. 3A is an exploded side elevation view of a crimp, a ferrule, a ferrule holder and a fiber.

The connector 10 is shown as including a crimp 32, a ferrule holder 34 and ferrule 30. The crimp 32 is generally cylindrical in shape and has a reduced diameter portion 38 on one end. The crimp 32 is received within a cylindrical cavity 36 formed in ferrule holder 34.

The crimp 32 is press fit within cavity 36 such that a length of the reduced diameter portion (referred to as $L_c$) is left unsupported within cavity 36 (for reasons that will be described the unsupported length $L_c$ is measured from the beginning 37 of the reduced diameter portion 38 to an end 70a of a crimp slot 70 rather than to end 32a). Accordingly, the unsupported length $L_c$ may expand or contract relative to the ferrule holder 34 in response to changes in temperature as will be more fully described.

The ferrule holder 34 has a centrally disposed bore 40 into which ferrule 30 is press fit. A length (referred to as $L_f$) of ferrule 30 extends from the end face 34a of holder 34 and terminates at the ferrule face 30a. Length $L_f$ is unsupported. The remainder of the ferrule length (which remainder is identified as length $L_x$ and is measured from ferrule rear end face 30b and to holder end face 34a) is a supported ferrule length which is press fit within ferrule holder 34. Length $L_f$ may expand or contract relative to the end face 34a in response to thermal expansion.

As will be more fully described, the fiber 14 is physically retained by the crimp 32 and free floating within ferrule 30. As a result, a length (represented by $L_{fib}$) of the fiber 14 is unsupported. As will be more fully described, the unsupported fiber length $L_{fib}$ is measured from crimp slot end 70a to fiber end 14a. As a result, this length $L_{fib}$ may expand or contract relative to the other elements of connector 10 in response to thermal expansion.

Finally, a length (represented by the designation $L_{fh}$) of the ferrule holder 34 between the point 37 of press fit connection with the crimp 32 and the ferrule rear end face 30b is disconnected from the other elements. Length $L_{fh}$ may expand or contract relative to the other connector elements in response to thermal expansion.

For reasons which will become apparent, the ferrule holder 34 is provided with a plurality of circumferential slots 76 along the length $L_{fh}$. The slots 76 increase the compressibility of the ferrule holder 34.

Figure 13:
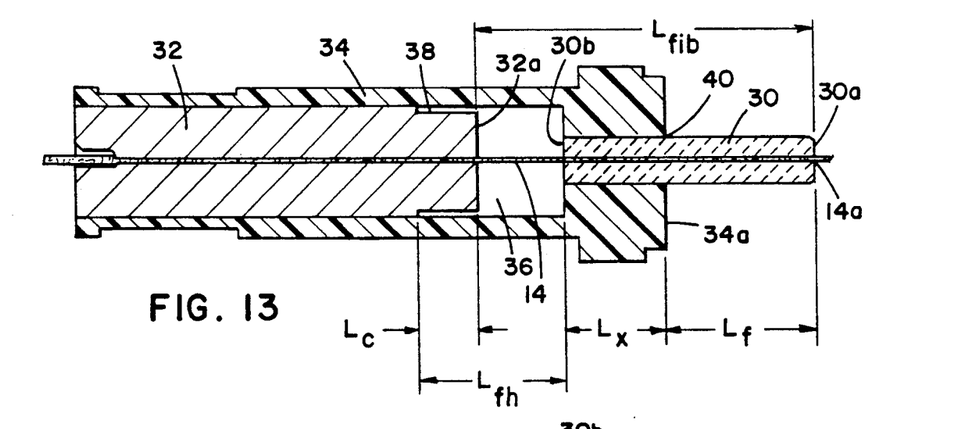
FIG. 13 is a schematic representation, taken in cross-section, of various connector elements and showing an unsupported crimp section.

For purposes of clarity, the crimp 32, ferrule holder 34, ferrule 30 and fiber 14 are shown schematically in FIG. 13 with the various lengths, $L_c$, $L_f$, $L_x$, $L_{fib}$, $L_{fh}$, identified.

3. Attachment of Connector To Adaptor

A protective sheath 42 in the form of a rectangular shroud surrounds ferrule holder 34 and ferrule 30 and is slidably received between ferrule holder 34 and body 16. Sheath 42 prevents accidental damage to ferrule 30.

A pair of identical retaining spring clips 44 are provided within body 16. Spring clips 44 have anchor ends 46 which oppose a flange 48 formed on the end of ferrule holder 34.

Opposing side walls 17 of body 16 are provided with slots 50 and 52 formed therethrough. The springs 44 include first protruding portions 54 with ramped or angled surfaces as shown in FIG. 3. The first protruding portions 54 are disposed to be aligned with and protrude through slots 50.

The springs 44 also include second protruding portions 56 which are disposed to align with and extend through slots 52. The second protruding portions 56 are sized to be engaged by an operator (such as by grasping the portions 56 between an operator's thumb and index finger) to compress the second protrusions 56 to cause the first protruding portions 54 to contract within slots 50 so that they do not protrude.

Opposing side walls 19 of the adaptor body 1 include slots 58 sized and positioned to align with slots 50 when the connector 10 is fully inserted within the adaptor 12. At this point, the protruding portions 54 may extend within slots 58 to securely lock the connector 10 within adaptor 12. In this alignment, the ferrule 30 is received within the split sleeve 26 as will be described.

Figure 3B:
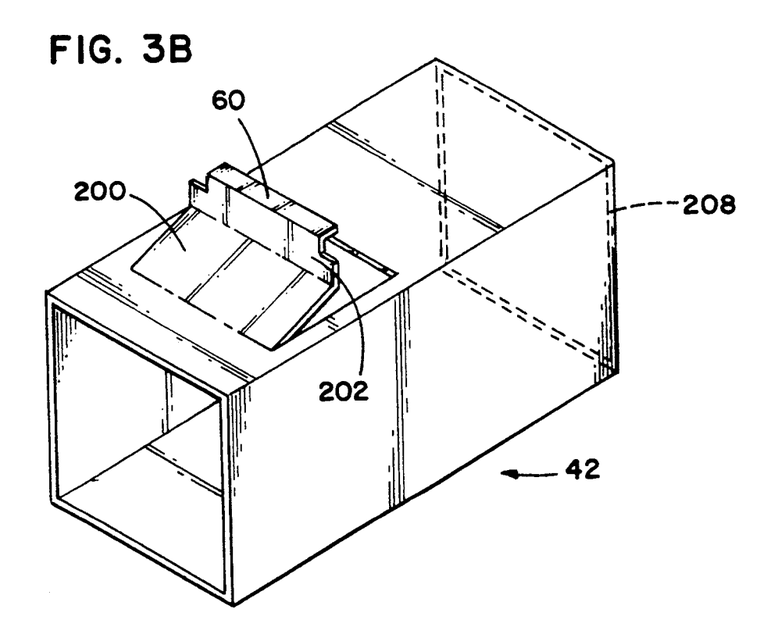
FIG. 3B is a perspective view of a shroud for use with the connector of the present invention.

As shown best in FIG. 3B, shroud 42 is box-shaped and has a latch 200 extending from one side thereof. The latch 200 includes a shroud latch surface 202 which is generally perpendicular to the side of the shroud 42 and a tab 60. The body 16 of the connector 10 includes an opening 204 (see FIG. 2) formed through one side thereof through which latch 200 may extend. The shroud latch surface 202 is sized to abut a body latch surface 206 as will be described.

When the connector is removed from the adaptor body 18 (as shown in FIG. 3), the tab 60 extends through a leading end 205 (shown numbered in FIG. 2) of the opening 204 with shroud latch surface 202 opposing body latch surface 206. This opposition results in retaining the shroud 42 in the extended position.

A ramp 62 is formed on one side of the adaptor 18. The ramp 62 and tab 60 cooperate to urge the shroud 42 into the interior of the connector 10 as the connector 10 is inserted within the adaptor 18 in a manner which will now be described. As the connector 10 is inserted into the adaptor body 18, the ramp 62 urges both tab 60 and the shroud latch surface 202 into the interior of the connector body 16 until the shroud latch surface 202 no longer opposes the body latch surface 206. At this point the shroud 42 is no longer latched in the extended position. As the connector is further inserted into the adaptor body 18, the shroud end 208 abuts an opposing surface 210 of adaptor body 18 to urge the shroud to retract into the connector 10. The tab 60 and ramp 62 also cooperate to act as an alignment or keying feature to ensure that only one alignment between the connector 10 and adaptor 18 is possible.

The urging of spring 64 causes the shroud 42 to force the connector 10 out of adaptor body 18 unless the connector 10 is fully inserted with shroud latch surface 202 opposing body latch surface 206. As a result, a visible indication is given to an operator regarding the connection. Namely, a simple sight inspection showing the connector 10 fully inserted or not fully inserted in adaptor body 18 indicates if the connector is latched.

A spring 64 is provided extending between the sheath 42 and anchor 46 to urge the sheath 42 to the extended position (shown in FIG. 3) surrounding ferrule 30 when the connector 10 is removed from adapter 12. To remove the connector 10 from the adapter 12, an operator presses the tabs 56 together causing the ramps 54 to contract within bodies 16 and out of locking engagement with slots 58.

A protective boot 67 is provided surrounding a sheathed portion 14b of a fiber 14. A main compression spring 66 is provided extending between boot 67 and crimp 32 to urge crimp 32 toward an opposing connector 10 as will be more fully described.

B. Details of Crimp Design

With the structure thus described, the reader will note that the crimp 32 is the only element of the connector 10 having a grasping contact on fiber 14. With best reference to FIGS. 4-7, the crimp is shown as including a generally cylindrical body 68 formed from two generally semi-cylindrical crimp halves or legs 33a,33b joined at the solid cylindrical reduced diameter portion 38. An axial slot 70 extends between halves 33a,33b from a rear end 32b and into the reduced diameter portion 38.

Figure 4:
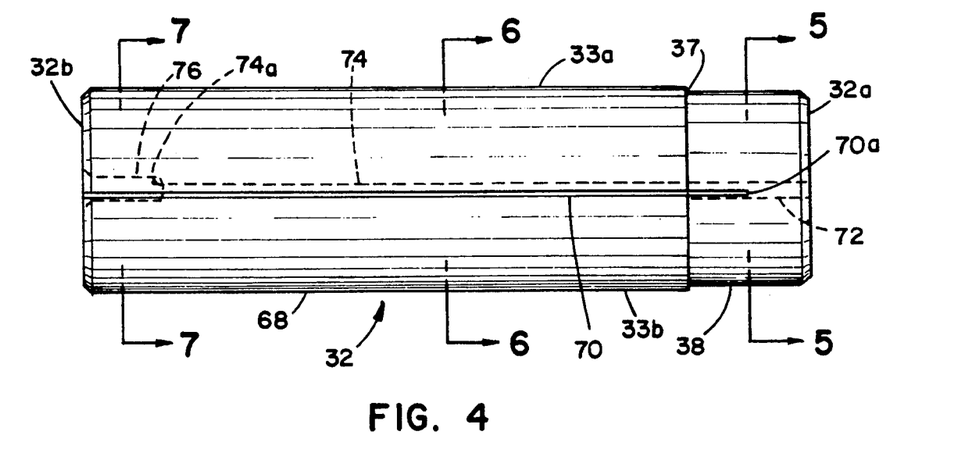
FIG. 4 is a view of a crimp for use with the connector of FIGS. 1-3.

A generally circular bore 72 is formed through reduced diameter portion 38 and extends to slot end 70a. The bore 72 is sized to freely receive fiber 14. Within the remainder of the crimp 32 a V-shaped groove 74 is formed by a V-shaped cut in the crimp half 33a opposing a flat surface of half 33b. Groove 74 extends in axial alignment with bore 72. Immediately adjacent end 32b is an enlarged diameter bore 76 sized to receive the sheathed fiber 14b.

The crimp 32 is preferably formed so that in a relaxed state (i.e., not inserted within a holder 34) the crimp 32 has what may conveniently be referred to as a clothespin shape. This clothes-pin shape is shown exaggerated in FIG. 4A.

Figure 4A:
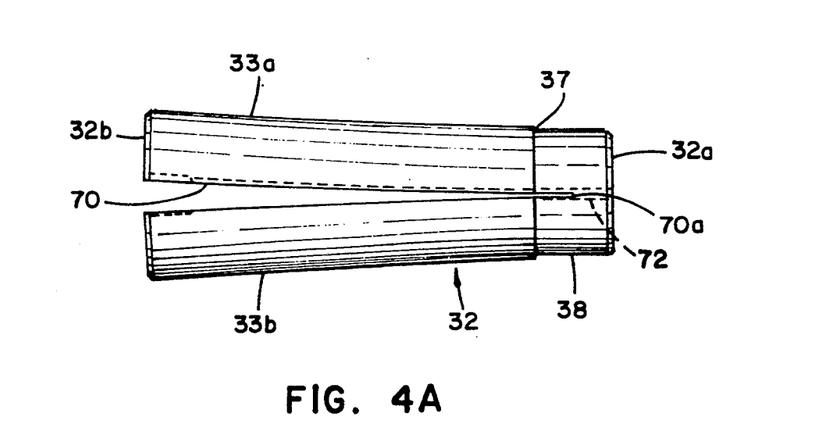
FIG. 4A is a schematic view of the crimp of FIG. 4 with certain dimensions of the crimp shown greatly exaggerated.
Figures 5, 6:
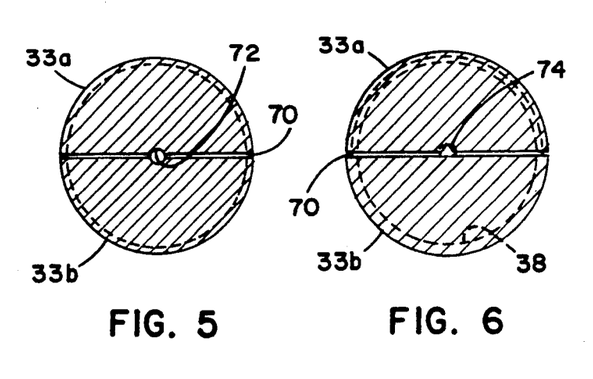
FIG. 5 is a view taken along line 5—5 of FIG. 4.
FIG. 6 is a view taken along line 6—6 of FIG. 4.
Figure 7:
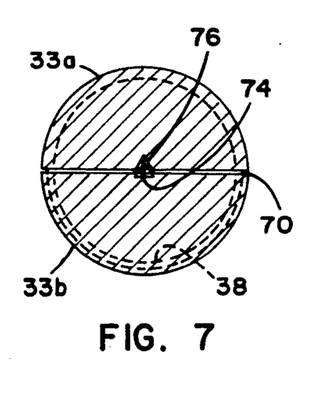
FIG. 7 is a view taken along line 7—7 of FIG. 4.
Figures 8, 9, 10:
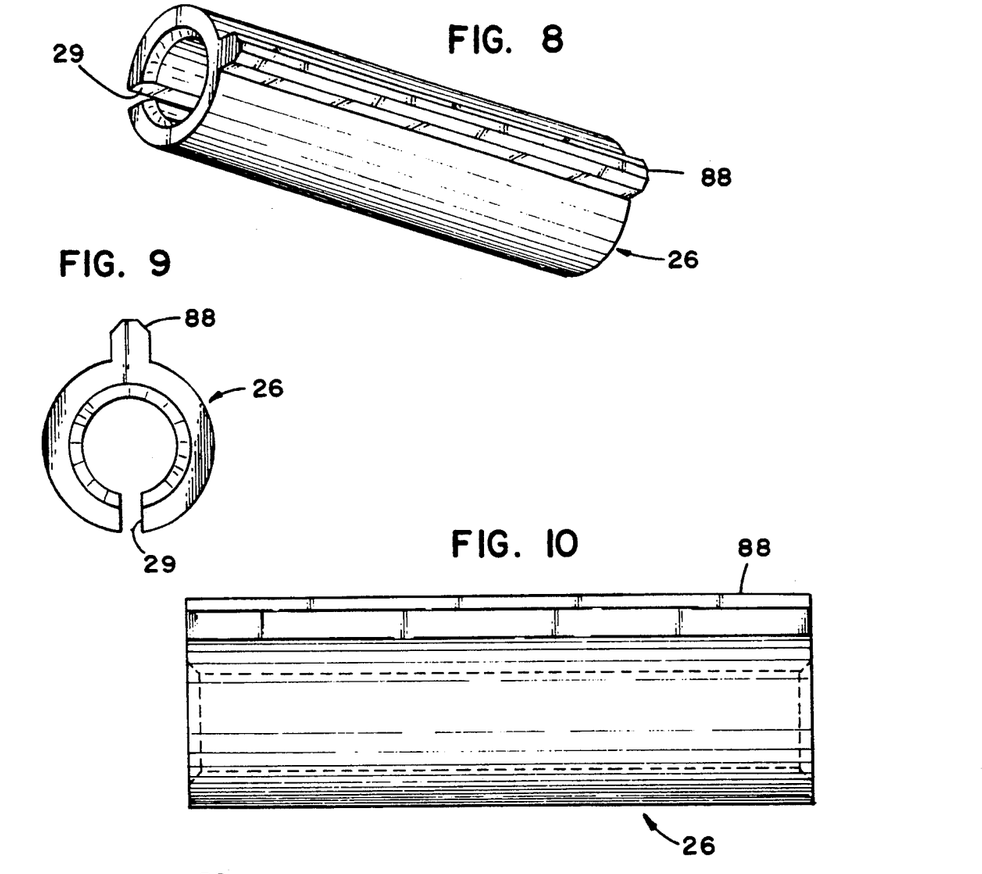
FIG. 8 is a perspective view of a split sleeve for use with the connector and adaptor of FIGS. 1-3.
FIG. 9 is an end view of the split sleeve of FIG. 8.
FIG. 10 is a side elevation view of the split sleeve of FIG. 8.

As shown in FIG. 4A, the slot 70 extends from terminal end 70a to end 32b with the size of the slot 70 progressively increasing from end 70a to crimp end 32b. Also, the slot defining crimp halves 33a and 33b are not truly cylindrical in the relaxed shape as shown in the exaggerated view of FIG. 4A. Instead, they are slightly curved outwardly along their axial dimension. Accordingly, when the crimp 32 is inserted within a cylindrical cavity 36 of a crimp holder 34, the sides 33a and 33b are forced together thereby narrowing gap 70.

A fiber 14 is retained within crimp 32 by positioning the fiber sheathed portion 14b within enlarged bore 76 and extending the remainder of the unsheathed fiber 14 through the V-groove 74 and bore 72. The crimp 32 is then forced within the body of the ferrule holder 34. The crimping action results in the fiber 14 being securely and rigidly held between the three opposing surfaces of the V-groove 74 (i.e., between opposing surfaces of crimp body halves 33a and 33b). The crimping action occurs along the length of slot 70. Accordingly, there is no crimping action on the fiber along the length of bore 72 between slot end 70a and crimp end 32a. Therefore, the length of the unsupported fiber ($L_{fib}$) is measured from fiber end 14a to slot end 70a rather than from end 14a to crimp end 32a.

The crimp 32 clamps onto the fiber with a force high enough to provide a predetermined fiber pullout force (in a preferred embodiment, this force is three kilograms). The crimp 32 is preferably made of aluminum and allows the fiber 14 to be inserted easily until the sheathed portion 14b contacts the end 74a of the V-groove 74. At this point, the fiber is fully inserted within the crimp 32. The crimp 32 is then pushed into the ferrule holder 34 causing the crimp 32 to exert the desired pressure on the fiber 14. When the crimp 32 is fully inserted within the ferrule holder 34, the crimp exerts a force of 1 kilogram (in the preferred embodiment) distributed uniformly distributed along the length of each of the three groove defining surfaces abutting the fiber 14. The exterior surface of the crimp 32 is press fit within the interior surface of the ferrule holder 34. Therefore, the crimp 32 is securely fastened within the ferrule holder 34.

In the preferred embodiment, with the desired pullout force (3 kilograms), the pullout force for each of the three contacting surfaces would be 1 kilogram. Assuming an aluminum crimp 32 and a glass fiber 14, the coefficient of friction between the glass and the aluminum is 0.4. Accordingly, a normal force on the fiber 14 (i.e., the force pushing against the fiber 14) is 2.5 kilograms per contacting surface. The crimp halves 33a,33b apply the force of 2.5 kilograms uniformly over the length of the fiber 14 to avoid stress points which could damage the fiber. The halves 33a,33b are curved during manufacture such that they will apply uniform pressure on the fiber 14 when the crimp 32 is fully inserted in the ferrule holder 34.

C. Design to Accommodate and Balance Thermal Expansion

It is desirable in the design of the connector that the fiber end 14a remain flush with the ferrule end 30a. However, the various components (i.e., the fiber 14, ferrule 30, ferrule holder 34 and crimp 32) are made of different materials having differing coefficients of thermal expansion. Accordingly, the present design includes a selection of materials and a calculation of material lengths so that the various components are tuned or balanced to ensure that the terminal ends 14a and 30a remain flush over a relevant range of operating temperatures.

With the structure as shown in FIGS. 1-3 and as schematically shown in FIG. 13, the relative lengths of the various components can be calculated by using the following balancing equation:

$$\Delta T(\alpha_c L_c - \alpha_{fib} L_{fib} - L_{fh} \alpha_{fh} - \alpha_x L_x - \alpha_f L_f) = \Delta L$$

$$\alpha_x = \frac{\alpha_f}{2} + \frac{\alpha_{fh}}{2}$$

where $\alpha_c$, $\alpha_{fib}$, $\alpha_{fh}$, $\alpha_f$ are the coefficient of thermal expansion for the material of the crimp 32, the fiber 30, the fiber holder 34 and the ferrule 30, respectively.

1. The ferrule 34 is preferably BC-L glass having a thermal expansion coefficient ($\alpha_f$) equal to $5.2 \times 10^{-6}/°C$.
2. The fiber is preferably fused silica having a thermal expansion coefficient of ($\alpha_f$) equal to $0.55 \times 10^{-6}/°C$.
3. The crimp 34 is preferably aluminum having a thermal expansion coefficient ($\alpha_c$) equal to $23.2 \times 10^{-6}/°C$.
4. The ferrule holder is preferably Vectra A 950 having a thermal expansion coefficient ($\alpha_{fh}$) equal to $-5 \times 10^{-6}/°C$.

And where:
  $\Delta L$ equals the relative change in length between the fiber end 14a and ferrule end 30a; and
  $\Delta T$ equals the change in operating temperature experienced by the connector 10 over within an operating range.

In a preferred embodiment, the materials and associated coefficients of thermal expansion are as follows:

Those skilled in the art will recognize that the materials identified above are commercially available and BC-L glass and Vectra A 950 are available through Nippon Electric Glass Co. Ltd. and Hoechst Celanese Corp., respectively.

It is desired that the value for the change in length ($\Delta L$) be zero. In a preferred design, the length of the ferrule ($L_f + L_x$) is predetermined. Also, the length of the supported portion ($L_x$) is predetermined. For example, in a preferred embodiment, $L_f$ and $L_x$ have values of 4 millimeters and 2.5 millimeters, respectively. Accordingly, substituting these values into the balancing equation (and setting $\Delta L = 0$), the balancing equation reduces to:

$$23.2\ L_c + 0.55\ L_{fib} + 0.5\ L_{fh} = 21.05 \text{ millimeters.}$$

Accordingly, the lengths of the unsupported portion of the crimp ($L_c$), the length of the unsupported fiber ($L_{fib}$) and the length of the unsupported fiber holder ($L_{fh}$) may be selected so that they satisfy this reduced equation. With this design, the dimensions and materials are chosen to minimize the relative movement of the end 14a of the fiber 14 with respect to the end face 30a of the ferrule 30 due to changes in temperature. This is important in order to maintain physical contact between opposing fibers as temperatures vary.

Figure 14:
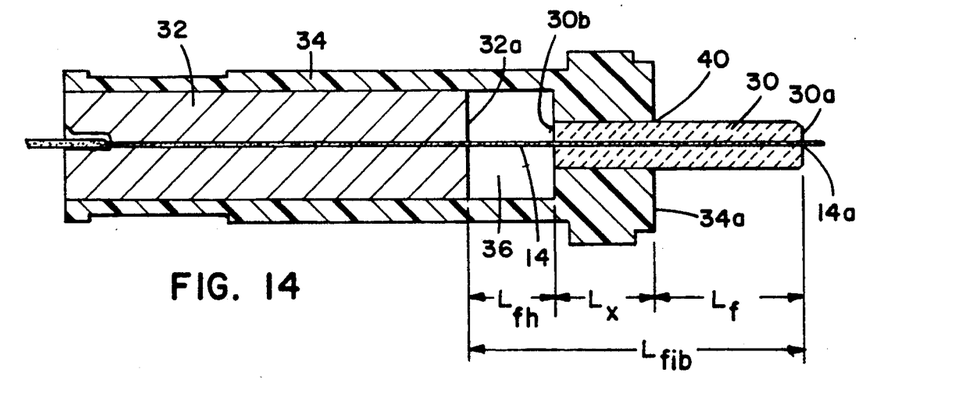
FIG. 14 is a schematic representation, taken in cross-section, of various connector elements with the absence of an unsupported crimp section.

The foregoing discussion with reference to the design of FIGS. 1-3 as schematically shown in FIG. 13, provides for an unsupported crimp portion $L_c$. An unsupported crimp portion $L_c$ would not be necessary in the event the ferrule holder 30a has a negative coefficient of expansion for the ferrule holder (e.g., using a material such as Vectra A 950). In such event, the length of $L_c$ may be placed at zero in the balancing equation and the model would be such as that shown in FIG. 14.

D. Design to Balance Compressive Forces

In addition to compensating for temperature expansion, an optical fiber connector 10 should compensate for compressive forces acting on the ferrules 30 and fibers 14. It has been determined experimentally that a force of approximately 50 grams is needed on the end faces 14a of opposing and abutting fibers 14 to assure physical contact of the fibers and adequate optical coupling. It is also desired to have the contact force between two connectors 10 (i.e., the combination of forces acting on opposing ferrules 30 and fibers 14) to be about 500 grams. (The total force of 500 grams is governed by providing a spring force of 500 grams for the main spring 66.) Therefore, the compressive force between the ferrules should be about 450 grams.

Since the fiber 14 is not adhered directly to the ferrule 30, the design of a balanced compression force is approached by matching the amount of compression of the fibers 14 to the compression of the ferrule 30 and ferrule holder 34 when the force on the fiber is 50 grams and the force on the ferrule is 450 grams. This allows the fiber 14 to be polished flush with the ferrule 30 yet still obtain physical contact with an opposing fiber when connectors are mated.

The amount of compression on a product is given by the equation:

$$\Delta L = L_0 F/(AE)$$

where:
  $L_0$ equals the original length;
  F equals the compressive force;
  A equals the cross-sectional area normal to the compressive force; and
  E equals Young's Modulas for the material of the product. (For known materials, Young's Modulas for each of the ferrule, ferrule holder and fiber is obtainable.)

The fiber has a length ($L_{fib}$) which will be known for a given design (in a preferred embodiment, $L_{fib}$ is about 9.66 millimeters). With a known fiber radius (e.g., 0.0625 millimeters), and a known Young's Modulas for the fiber 14 (e.g., 7314 kg/mm² for fused silica), the amount of compression on the fiber is calculable (e.g., in response to a desired 50 grams of force, the compression of the fiber 14 equals 5.38 micrometers for the values given). Accordingly, the ferrule 30 and ferrule holder 34 should be designed so that they compress an equal amount (i.e., 5.38 micrometers) with a an applied force of 450 grams in order to assure that a 50 gram force remains on the fiber 14.

The desired compression for the ferrule 30 and holder 34 can be achieved by adjusting the thickness of the ferrule holder 34 and the ferrule 30. Also, the ferrule holder 34 can be made more compressive in nature by providing the slots 76 previously described. By providing these slots 76, the ferrule holder 34 becomes an assembly of connected beams which will compress in response to a force applied to the ferrule 30. By providing cutouts 76, material selection and thickness, the ferrule holder 34, ferrule 30 and fiber 14 can be designed within the skill of one of ordinary skill in the art to compress an amount equal to the compression of the fiber 14 when the desired force of 450 grams is applied to the ferrule 30.

E. Non-Circular Split Sleeve Design

Figure 11:
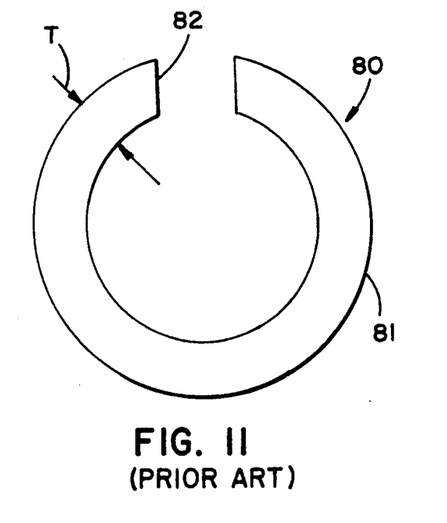
FIG. 11 is a cross-sectional view of a prior art split sleeve of uniform thickness.

In attaching connector 10 to the adapter 12 it is desirable to have uniform pressure applied to the ferrule 30 by the split sleeve 26. Prior art split sleeves 26 were uniformly thick in cross-section and generally cylindrical. An example of a prior art split sleeve 80 is shown in FIG. 11 which includes a generally cylindrical sleeve 81 having an axially extending slit 82. The wall thickness, T, of the prior art cylindrical split sleeve 80 was uniform.

It is recognized that the uniformly thick cylindrical split sleeve 80 does not provide uniform pressure on a ferrule. One approach to providing uniform pressure is shown in U.S. Pat. No. 4,541,685 which describes a split sleeve of nonuniform thickness. The present invention utilizes a uniformly thick split sleeve 26 which is non-cylindrical in dimension.

The design of the split sleeve 26 of the present invention utilizes a non-cylindrical geometry in a sleeve 26 of substantially uniform wall thickness to achieve uniform pressure.

Figure 12:
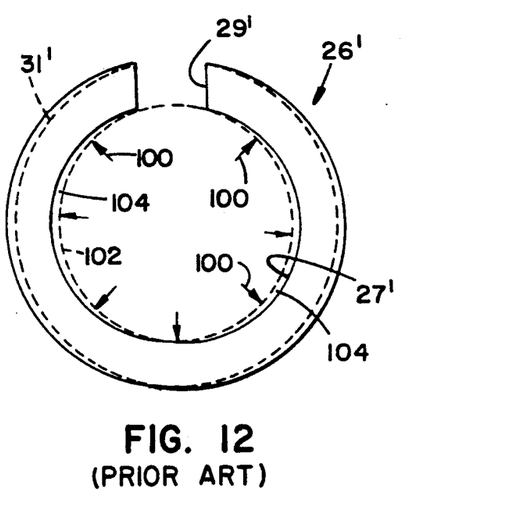
FIG. 12 is an exaggerated view of a prior art split sleeve expanded by a uniform pressure.

To fabricate the novel split sleeve 26, a uniformly thick wall sleeve is modeled using finite element analysis (which is a modeling technique well known to those skilled in the art). In modeling the sleeve 26, a starting design 26' (see FIG. 12) of circular internal diameter 27' is utilized. A uniform internal pressure is applied along a known diameter (shown as force vectors 100 applied along diameter 102 in FIG. 12). Due to the slit 29', the model expands such that its internal diameter 27' is now noncircular as shown in FIG. 12. With the expanded design as shown, material equal to the difference between the circular and actual cross-section is applied to define the desired wall thickness (i.e., material is added to fill gaps 104). Material is then removed from the external diameter so that uniform thickness is maintained (i.e., material is removed between original external diameter 31' and the new external diameter 31" to achieve uniform wall thickness).

Figure 12A:
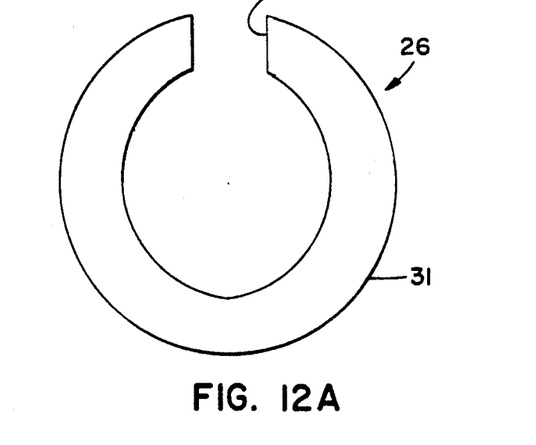
FIG. 12A is a cross-section view greatly exaggerated in dimensions, of the split sleeve of the present invention (with a non-rotating key element removed)

With the design process as described, the split sleeve 26 is non-circular before a ferrule 30 is inserted and circular when expanded in response to the insertion of the ferrule 30. This design applies to ferrules 30 having precisely controlled outside diameters since circularity with uniform pressure is achieved by the split sleeve 26 only at one design diameter. However, ferrules 30 having accurately controlled outside diameters are known in the art. A sleeve 26 having material added to its inside diameter 27 and removed from its outside diameter 31 to achieve a non-circular inside diameter before insertion of a ferrule is shown in FIG. 12A.

An alternative method of fabricating split sleeve 26 is to perform a finite element analysis starting with a uniform wall thickness sleeve which is circular in cross-section in response to uniform pressure. The model is then modified by reducing the pressure to zero and noting the dimensions of the collapsed sleeve.

It is believed the present design presents advantages over prior uniform pressure split sleeves of non-uniform thickness (e.g., the design of U.S. Pat. No. 4,541,685). For example, a uniformly thick sleeve is believed to be less susceptible to warping.

F. Non-Rotating Sleeve Design

It is also desirable that the sleeve 26 not rotate relative to the ferrules 30. In theory, such rotation should not have a material effect. However, we have determined that rotation will affect the amount of optical loss across opposing ferrules. Namely, the amount of the loss will vary cyclically as the sleeve 26 rotates relative to the ferrules 30. In order to achieve a predictable nonvarying loss, the sleeve 26 is maintained in fixed rotational alignment with the ferrules 30 by providing a key 88 along the length of the sleeve 26 which is received within a groove 89 formed in end face 22 of adapter 12 (see FIG. 3).

G. Anti-Chipping Polish

In a desired design having maximum optical performance, it is preferred that the end faces 30a of the ferrules 30 not be polished at right angles to the axis of the fibers 14. Instead, a slight angle A, (for example, 10 degrees as shown in FIG. 15) is provided on the face of the ferrules 30 and the fibers 14 to prevent back reflection.

In the desired case where fibers are in physical contact when optically coupled, there is a potential for a fiber 14 to be forced into the fiber containing bore 30c (see FIG. 15) of an opposing ferrule 30. More likely, the end 14a of the fiber 14 would catch the end 30a of the opposing ferrule 30 at the opposing bore 30c. This could result in chipping of the fiber 14 or the ferrule 30. To prevent this chipping, a convex recess 30d is formed in the fiber and ferrule end surfaces 14a, 30a (See FIG. 15). The convex recess 30d can be applied by using the polishing technique shown and described in commonly assigned and copending U.S. patent application No. 07/467,803, filed Jan. 19, 1990.

H. Offset Sleeve Design

Figure 15:
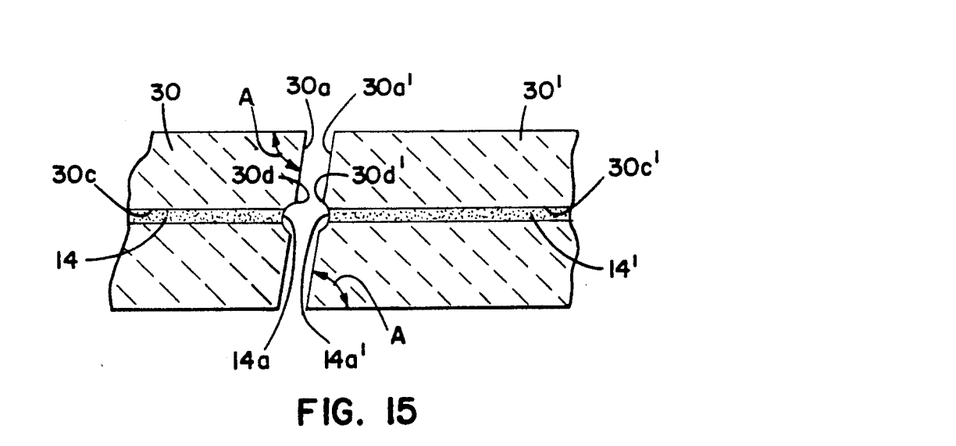
FIG. 15 is an enlarged cross-sectional view of opposing ferrules and fibers.

As best shown in FIG. 15, the opposing fibers 14 and ferrules 30 are complementarily angled at non-orthogonal angles, A (preferably 10°) relative to the axis of the fibers 14. With this design there is a natural tendency for the end surfaces 14a to slip in response to axial forces urging the fibers 14 together. This results from the fibers 14 being held in crimps 32 and being loose within ferrules 30.

A crimp connector differs from a fiber optic connector with adhesives. In the latter case, a fiber is permanently bonded within a ferrule by adhesives after curing. In a crimp connector, the fiber is not bonded within the ferrule. Accordingly, the fiber may float slightly in a radial direction within the ferrule. This could result in slight misalignment of the fibers.

Figure 16:
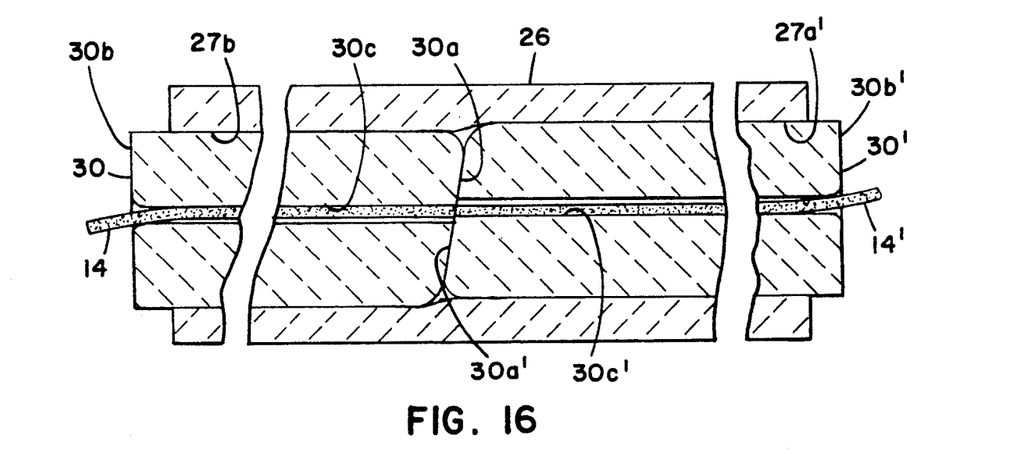
FIG. 16 is an enlarged cross-sectional view, with dimensions exaggerated, showing an offset split sleeve according to the present invention.
Figure 17:
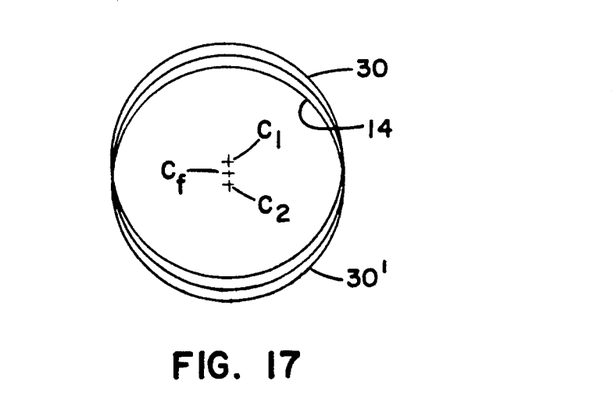
FIG. 17 is a schematic representation showing alignment of fibers using the split sleeve of FIG. 16.

Recognizing the tendency of the fiber ends 14a to slip, the interior bore 27 of the split sleeve 26 is intentionally offset. As a result, the bore 27 is not straight but includes two portions 27a, 27b which are radially offset from one another by an amount equal to an anticipated offset of the fibers 14 being forced together. Accordingly, the centerline, $C_1$ (see FIG. 17) of the crimp of one fiber is offset from the centerline $C_2$ of the crimp of the other fiber. The offset split sleeve 26, shown exaggerated in FIG. 16, compensates for the offsetting tendency of the slipping fibers 14 to ensure optical alignment. In FIG. 16, the faces 30a, 30a' are shown chamfered to prevent interference with the sleeve 26. FIG. 17 shows the relative positioning of the offsetting ferrules 30, 30' and the resulting alignment of the fibers 14 and the offsetting centerlines $C_1, C_2$ of the crimps and the resulting centerlines of the fibers, $C_f$.

From the foregoing detailed description of the present invention, it has been shown how the objects of the invention have been attained in a preferred manner.

However, modifications and equivalents of the disclosed concepts such as those which will occur to one skilled in the art are intended to be included within the scope of the claims.

What is claimed is:

1. An optical fiber connector comprising:

an optical fiber;

a crimp for securely grasping said fiber and having opposing surfaces movable to a crimp position to grasp said fiber when said fiber is disposed between said opposing surfaces;

a ferrule having a bore therethrough, said fiber extending into said bore;

a ferrule holder connecting said crimp and said ferrule;

said ferrule holder, ferrule crimp and fiber formed of material selected and dimensioned for a terminal end of said ferrule to be retained in a generally fixed alignment with a terminal end of said fiber in response to temperature variations.

2. An optical fiber according to claim 1 wherein said ferrule holder, ferrule crimp and fiber are provided with predetermined dimensions and are selected of materials having coefficients of thermal expansion selected for said coefficients and said lengths to cooperate to retain said terminal ends in said alignment.

3. An optical fiber connector according to claim 2 wherein said ferrule holder, ferrule, crimp and fiber are selected to satisfy the following equation:

$$\Delta T(\alpha_c L_c + \alpha_{fib} L_{fib} - L_{fh} \alpha_{fh} - \alpha_x L_x - \alpha_f L_f) = \Delta L$$

$$\alpha_x \approx \frac{\alpha_f}{2} + \frac{\alpha_{fh}}{2}$$

$L_c$ is a length of an unsupported portion of said crimp;
$L_x$ is a length of a supported portion of the ferrule connected to said ferrule holder;
$L_f$ is an unsupported length of said ferrule;
$L_{fib}$ is an unsupported length of said fiber extending from said crimp into said ferrule; and
$L_{fh}$ is a length of said ferrule holder between points of connection to said crimp and said ferrule, and where $\alpha_{fh}$, $\alpha_f$, $\alpha_c$, $\alpha_{fib}$ are coefficients of expansion of materials of said ferrule holder, ferrule, crimp and fiber, respectively and where $\Delta L$ equals a change in relative position between said terminal ends and where $\Delta T$ is a change in operating temperature experienced by said connector.

4. An optical fiber according to claim 2 wherein said crimp has a portion thereof rigidly secured to said ferrule holder and said crimp has a portion which is unsupported to be movable in response to thermal expansion relative to said ferrule holder, said ferrule includes a portion rigidly secured to said ferrule holder and said ferrule further include a portion unsupported and movable relative to said ferrule holder in response to said temperature variations, said fiber including a portion rigidly secured to said crimp and further including a remaining portion extending from said rigidly secured portion and into said ferrule, said ferrule holder including an unsecured portion extending between secured portions of said ferrule and said crimp.

5. An optical fiber connector according to claim 1 comprising primary urging means for urging said connector against an opposing connector with a predetermined total force, said primary urging means including means for applying an acting force against said ferrule and said fiber;

said ferrule, ferrule holder and fiber selected for said predetermined total force to be distributed between said ferrule and said fiber for a predetermined minimum force to be experienced by said fiber.

6. A connector according to claim 1 wherein said optical fiber connector includes an adaptor with means for securing said connector to said adaptor, said adaptor having a split sleeve disposed to receive said ferrule and align said ferrule with an opposing ferrule of an opposing connector attached to said adaptor, said split sleeve having a rest shape assumed by said sleeve with an absence of a ferrule within said sleeve, said rest shape having a non-circular interior diameter formed to be circular in response to a uniform force acting against said interior diameter at a predetermined diameter.

7. An optical fiber according to claim 1 wherein said terminal end of said ferrule is provided with a concave recess.

8. A connector according to claim 1 comprising an adaptor for receiving said connector, means for urging said connector out of said adaptor when said connector is not fully inserted into said adaptor.

9. An optical fiber connector comprising:

an assembly including a ferrule holder, a crimp having opposing surfaces movable to a crimp position to grasp a fiber when said fiber is disposed between said opposing surfaces, a ferrule and a fiber having a portion thereof disposed between said opposing surfaces and grasped by said crimp and with said fiber extending from said crimp into said ferrule, said ferrule holder connecting said crimp and said ferrule;

primary urging means for urging said assembly against an opposing assembly at a predetermined total force;

said assembly selected for said total force to be distributed between said ferrule and said fiber for a predetermined minimum force to be borne by said fiber.

10. An optical fiber connector comprising:

an assembly including a ferrule holder, a crimp, a ferrule and a fiber with said crimp rigidly secured to a portion of said fiber and said fiber extending from said crimp into said ferrule, said ferrule holder connecting said crimp and said ferrule;

primary urging means for urging said assembly against an opposing assembly at a predetermined total force;

said assembly selected for said total force to be distributed between said ferrule and said fiber for a predetermined minimum force to be borne by said fiber;

said ferrule holder, fiber and ferrule are dimensioned and formed from materials selected for a linear compressive displacement of said ferrule to approximate a linear compressive displacement of said fiber in response to said ferrule and fiber being urged against an opposing ferrule and fiber by said predetermined total force.

11. A connector according to claim 10 wherein said ferrule and ferrule holder are selected to compress an amount equal to an anticipated compression of said fiber in response to said predetermined minimum force.

* * * * *